Aug. 24, 1965    O. C. MOODY ETAL    3,201,993
GAS SAMPLING APPARATUS
Filed Feb. 4, 1963

INVENTORS.
OLIVER C. MOODY
DAVIS I. CARTER
BY
*Brown, Schuyler, and Beveridge*
ATTORNEYS

United States Patent Office 3,201,993
Patented Aug. 24, 1965

3,201,993
GAS SAMPLING APPARATUS
Oliver C. Moody and Davis I. Carter, Atlanta, Ga., assignors to Owens-Illinois Glass Company, a corporation of Ohio
Filed Feb. 4, 1963, Ser. No. 256,028
4 Claims. (Cl. 73—421.5)

This invention relates to gas sampling and apparatus, and more particularly to an apparatus for withdrawing samples of flue gas from furnace stacks for analysis to increase the efficiency of operation of the furnace.

The conventional method of obtaining flue gas samples from furnace stacks usually employs a tubular assembly which is projected through the furnace stack wall into the interior of the stack. In the usual case, the tube is formed with an inlet opening into the stack and a water supply is conducted through the tube to induce a flow of water and flue gas out of the tube to be conducted to conventional apparatus where the sample is prepared and analyzed in a well known manner. The basic problem encountered in all sampling methods and apparatus of which we are aware is that of obtaining a gas sample which is truly representative of the over-all flue gas composition. This difficulty is encountered because the flow patterns of the flue gas within the furnace stack are such that over an imaginary transverse cross-sectional area of the interior of the stack, the composition of the flue gas is found to vary substantially. Thus, gas samples collected from a single point within the stack usually are not repreesntative of the over-all flue gas composition and, in addition, may vary from time to time even though the furnace operating conditions are held constant. In some instances, attempts have been made to minimize this problem by collecting samples from a plurality of locations in the stack, but even sampling from a plurality of locations does not give accurately repeatable analyses and, at best, can give only an approximate average of the flue gas composition.

It is therefore a primary object of the present invention to provide an apparatus for obtaining a truly representative sample of flue gas from a furnace stack.

It is another object of the invention to provide an apparatus by means of which an accurate analysis of flue gas composition can be obtained by the withdrawal of a flue gas sample from a single location in the furnace stack.

Other objects and features of the invention will become apparent by reference to the following specification and to the drawings.

Figure 1:
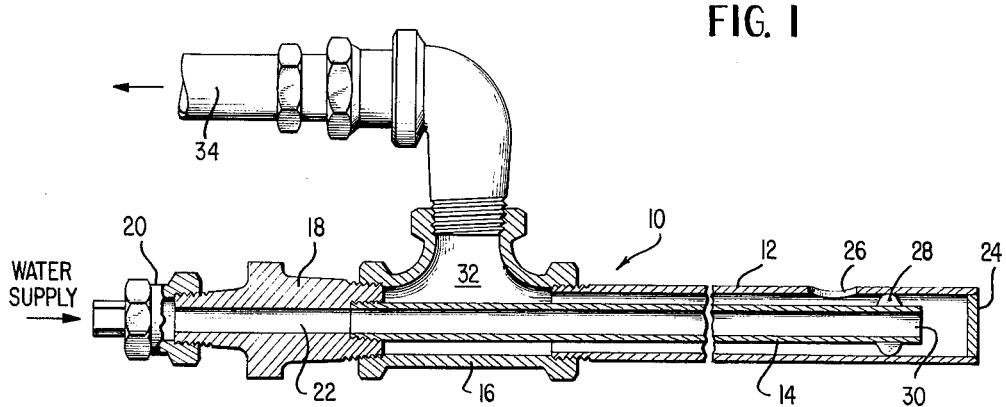
FIG. 1 is a detail side elevational view, partially in cross-section, of a gas sampling tube embodying the invention.

Referring first to FIG. 1, a sample tube assembly 10 employed in the practice of the invention is shown in longitudinal cross-sectional view. Because of the manner in which gas to be sampled is presented to the sample tube, the tube, as illustrated in FIG. 1, is of extremely basic construction and does not require the substantial structural refinements found in many commercial sample tubes presently in use. The tube assembly 10 of FIG. 1 is designed primarily from the standpoint of manufacturing convenience and can be constructed from lengths of standard size tubing combined with standard fittings. The sample tube itself consists of an outer tubular section 12 and an inner tubular section 14 supported within outer section 12 in concentric relationship. Outer member 10 is threadably mounted at one end in a T section 16, the opposite end of T section 16 being threadably connected to an adapter fitting 18 which in turn is connected at its other end to a source of water supply by means of a fitting 20. Inner tubular member 14 is threadably received at one end within adapter 18 so that inner member 14 forms a continuation of the internal water carrying passage 22 through adapter 18.

The outer end of outer tubular member 12 is closed by a cap 24 which may be fixedly secured in place as by brazing or welding. A gas inlet opening 26 is bored through the wall of outer member 12 and communicates with the annular space between the concentrically disposed tubular members. The outer end of inner member 14 is concentrically supported within member 12 by suitable protuberances such as 28 which may take the form of weldments or the like. Protuberances 28 are spaced from each other to provide a free flow of water issuing from the open end 30 of member 14 into the annular space between members 12 and 14 which in turn is in direct communication with the interior 32 of T fitting 16. The third leg of T fitting 16 is connected to an outlet conduit 34 which carries a combined mixture of water and flue gas drawn into the interior of the tube through opening 26 to the handling and analysis apparatus in a well known manner.

Figure 2:
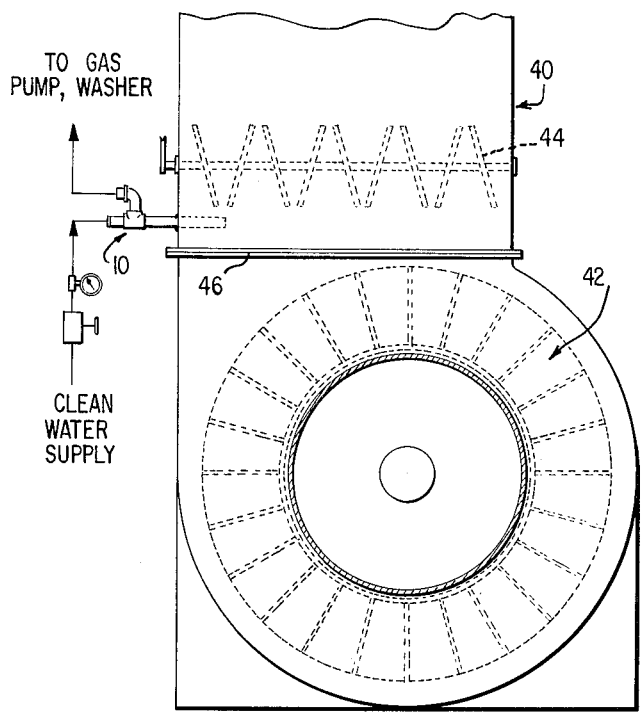
FIG. 2 is a side elevational view, partially schematic, of a typical gas sampling installation embodying the present invention employed in combination with a forced draft furnace stack.

Referring now to FIG. 2, the invention is disclosed as being practiced to withdraw a sample from a forced draft furnace stack designated generally 40. Conventional elements of the forced draft and furnace combination include a blower 42 having an axially extending inlet from the furnace (not shown) which is driven by suitable means, not shown, to induce a forced draft withdrawing combustion gas products from the furnace and discharging them upwardly through stack 40. A damper assembly 44 is located within the stack above the outlet side of blower 42 and is operated in a conventional manner to control first draft as desired.

A sampling tube 10 of the FIG. 1 construction is mounted in stack 40 to project into the stack at a location between the blower outlet schematically indicated at 46 and damper 44. It will be noted that a conventional forced draft system is such that all flue gas flowing from the furnace to the stack passes through the forced draft blower and, in passing through the blower is subjected to great turbulence. The turbulent action of the blower causes a complete mixture of the gas, and the gas discharged from the blower toward damper 44 is of substantially homogenized composition so that a sample withdrawn from the gas while it is in this state provides a truly representative sample of the flue gas composition. By withdrawing the sample from the location indicated in FIG. 2 directly at the blower outlet, but between the blower and damper, the sampling device is enabled to take advantage of the thorough mixing action performed on the flue gas by the blower as the blower performs its draft inducing operation. It will be noted that further turbulence is created at the upstream side of the damper, at which the sampling tube is located, by virtue of the flow restricting action of damper 44.

Figure 3:
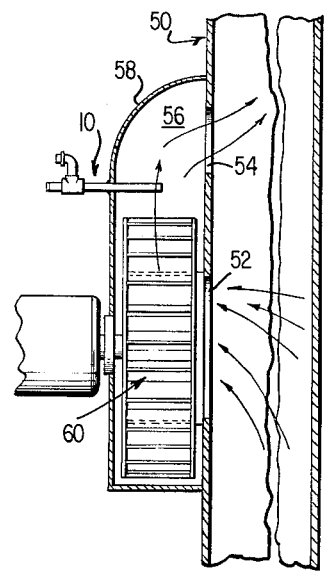
FIG. 3 is a cross-sectional view of a gas sampling installation embodying the present invention employed on a natural draft furnace stack.

Referring now to FIG. 3, a gas sampling tube 10 of the FIG. 1 construction is disclosed in a combination designed to obtain an homogenized gas sample from a natural draft furnace stack designated generally 50. To this end, two vertically spaced openings 52 and 54 are formed in stack 50 at one side of the stack. Openings 52 respectively define the inlet and outlet of a bypass passage 56 which is formed by an enclosure 58 of any suitable construction mounted on the exterior of stack 50 to form a closed chamber having its inlet and outlet at 52 and 54 respectively. A motor driven blower 60 of any conventional construction is mounted within enclosure 58 and located in operative relationship with opening 52 such that opening 52 cooperates with the blower structure to define the blower intake opening.

The characteristics of blower 60 are selected to be such that during normal operation it induces a flow of flue gas from the interior of stack 50 through bypass passage 58 at a rate such that flow of flue gas is induced from the entire internal cross-sectional area of stack 50 in the region adjacent intake opening 52. In other words, the flow induced through opening 52 by blower 60 is such that at least some of the flue gas flowing through stack 52 along the opposite side of stack 50 from opening 52 is drawn into opening 52 and passes through blower 60. This does not mean that all flue gas passing upwardly through stack 50 is drawn into bypass passage 56, but sufficient amounts of gas are withdrawn from all regions of the stack so that the composition of gas flowing through intake 52 is truly representative of the over-all composition of the flue gas.

As in the case of the forced draft installation, the zone of turbulence established by operation of blower 60 intimately mixes the gas so that gas passing from blower 60 toward outlet opening 54 is of substantially uniform composition and this composition, in turn, is truly representative of the over-all composition of the flue gas flowing through stack 50.

While we have described exemplary embodiments of our invention, it will be apparent to those skilled in the art that the disclosed embodiments may be modified. Therefore, the foregoing description is to be considered exemplary, rather than limiting, and the true scope of our invention is that defined in the following claims.

We claim:

1. A gas sampling tube assembly for withdrawing a sample of flue gas from a furnace stack; said assembly consisting of a first elongate hollow outer tubular member closed at one end and having an opening through its wall at a location spaced from said one end, a second elongate hollow tubular member open at both ends concentrically mounted within said first member to define an annular passage in said first member between the inner side of said first member and the outer side of said second member, one end of said second member being longitudinally located within said first member at a location between said one end of said first member and said opening, said second member having adjacent said one end thereof a plurality of radially extending protuberances engaging the wall of said first member to support said second member in spaced relation to said first member, the other end of said second member projecting from the other end of said first member, means for connecting said other end of said second member to a fluid source, an outlet conduit, and means on said other end of said first member for connecting said annular passage to said outlet conduit.

2. In a furnace having a stack for exhausting flue gases the combination comprising means mounted to the stack forming a by-pass passage extending along a section of the stack, by-pass inlet and outlet ports in the wall of the stack communicating with the opposite ends of the by-pass passage, a blower located within the by-pass passage adjacent said inlet port for inducing a flow of gas into the by-pass passage from the furnace and for causing turbulence in the gas emitted into said by-pass passage, and a gas sampling device mounted to said means and projecting into said by-pass passage between said blower and outlet port for withdrawing a sample of flue gas from the area of said by-pass passage located between said blower and outlet port.

3. A gas sampling tube assembly for withdrawing a sample of flue gas from a furnace stack comprising a T fitting, a conduit adapter having one end secured to one end of said T fitting and having another end adapted to be connected to a source of water, an elongated outer tube closed at one end and having its other end secured to the other end of said T fitting, said outer tube having an opening through its wall adapted to emit flue gas from the furnace, an elongate inner tube open at both ends concentrically mounted within said outer tube to define an annular passage between said tubes, one end of said inner tube being secured to said one end of the adapter to thereby receive water introduced into the adapter, said inner tube projecting beyond said other end of said outer tube and defining with the T fitting an outlet passage, a separate outlet conduit connected to said T fitting in communication with the outlet passage, and said inner tube having adjacent the other end thereof a plurality of radially extending protuberances engaging the outer tube to thereby support the inner tube in spaced relation to the outer tube.

4. In a furnace having a stack for exhausting flue gases the combination comprising means mounted to the stack forming a bypass passage extending along a section of the stack, bypass inlet and outlet ports in the wall of the stack communicating with the opposite ends of the bypass passage, means located adjacent said inlet port for inducing a flow of gas into the bypass passage from the furnace and for causing turbulence in the gas emitted into said bypass passage, and a gas sampling device mounted to said first mentioned means and projecting into said bypass passage between said second mentioned means and said outlet port for withdrawing a sample of flue gas from the area of said bypass passage located between said second mentioned means and said outlet port.

References Cited by the Examiner

UNITED STATES PATENTS

| | | | |
|---|---|---|---|
| 1,658,391 | 2/28 | Potter | 73—421.5 |
| 2,322,018 | 6/43 | Huber | 73—422 |
| 2,635,565 | 4/53 | Hersh | 110—162 |
| 2,925,735 | 2/60 | Tapp et al. | 73—422 |
| 2,934,958 | 5/60 | Kingma | 73—421.5 |

RICHARD C. QUEISSER, *Primary Examiner.*

JOSEPH P. STRIZAK, *Examiner.*